M. McILVEENE & L. A. HAYES.
POTATO DIGGING MACHINE.
APPLICATION FILED APR. 25, 1911.

1,019,681.

Patented Mar. 5, 1912.

2 SHEETS—SHEET 1.

M. McILVEENE & L. A. HAYES.
POTATO DIGGING MACHINE.
APPLICATION FILED APR. 25, 1911.

1,019,681.

Patented Mar. 5, 1912.

2 SHEETS—SHEET 2.

Witnesses
H. M. Brooks
H. C. Robb

Inventors
M. McIlveene
L. A. Hayes
By Peelers Robb
Attorneys

UNITED STATES PATENT OFFICE.

MINEOLA McILVEENE, OF LUEDERS, AND LEWIS A. HAYES, OF WEATHERFORD, TEXAS.

POTATO-DIGGING MACHINE.

1,019,681. Specification of Letters Patent. Patented Mar. 5, 1912.

Application filed April 25, 1911. Serial No. 623,241.

*To all whom it may concern:*

Be it known that we, MINEOLA MCILVEENE and LEWIS A. HAYES, citizens of the United States, residing at Lueders, in the county of Jones, and Weatherford, in the county of Parker, respectively, and State of Texas, have invented certain new and useful Improvements in Potato-Digging Machines, of which the following is a specification.

The present invention involves certain improvements in potato digging machines of the type embodying suitable means for removing the potatoes from the ground, elevating the same to a suitable sieve which is agitated, and finally feeding the potatoes to bags adapted to be supported at the delivery end of the machine.

Provision is made whereby the dirt is separated from the potatoes between the operations of removing the same from the ground and finally depositing them in bags, as customary in such machines, the present invention residing particularly in the peculiar means employed for cutting the vines and excavating the potatoes.

For a full understanding of the present invention, reference is to be had to the following description and to the accompanying drawings, in which—

Figure 1:
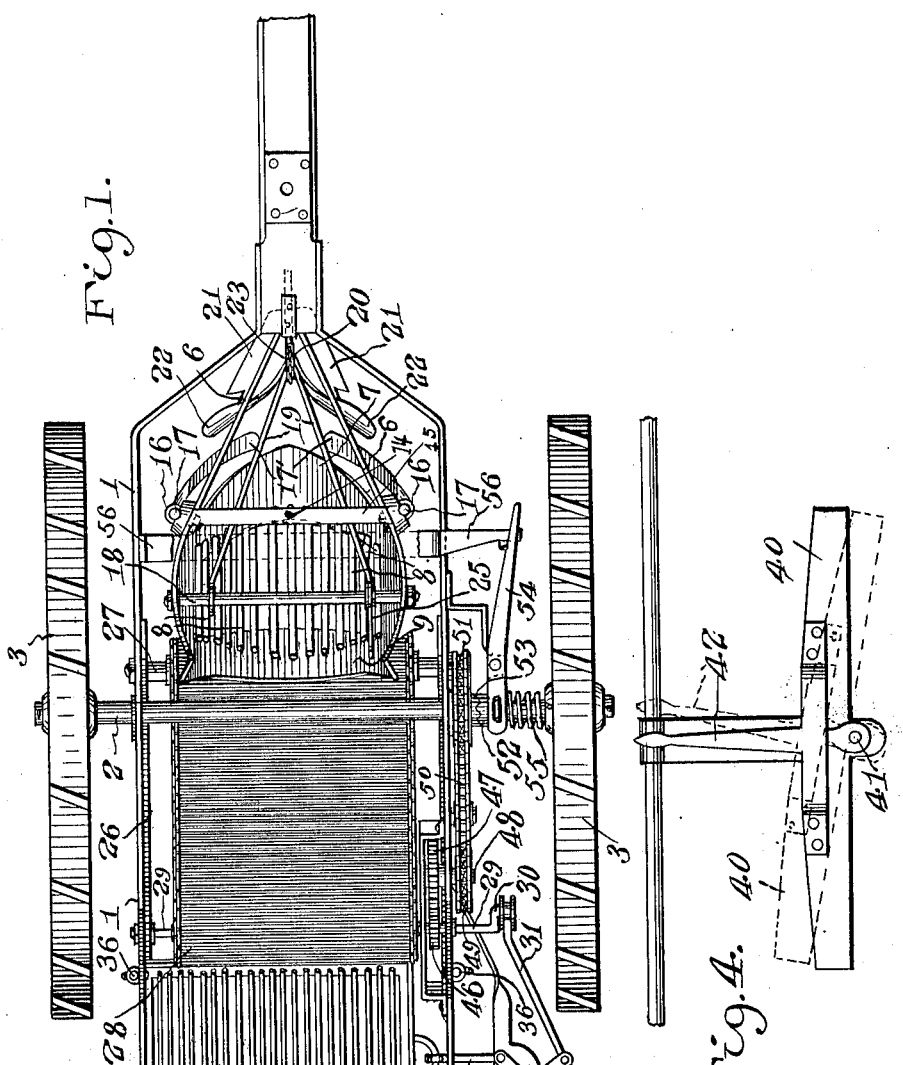
Figure 2:
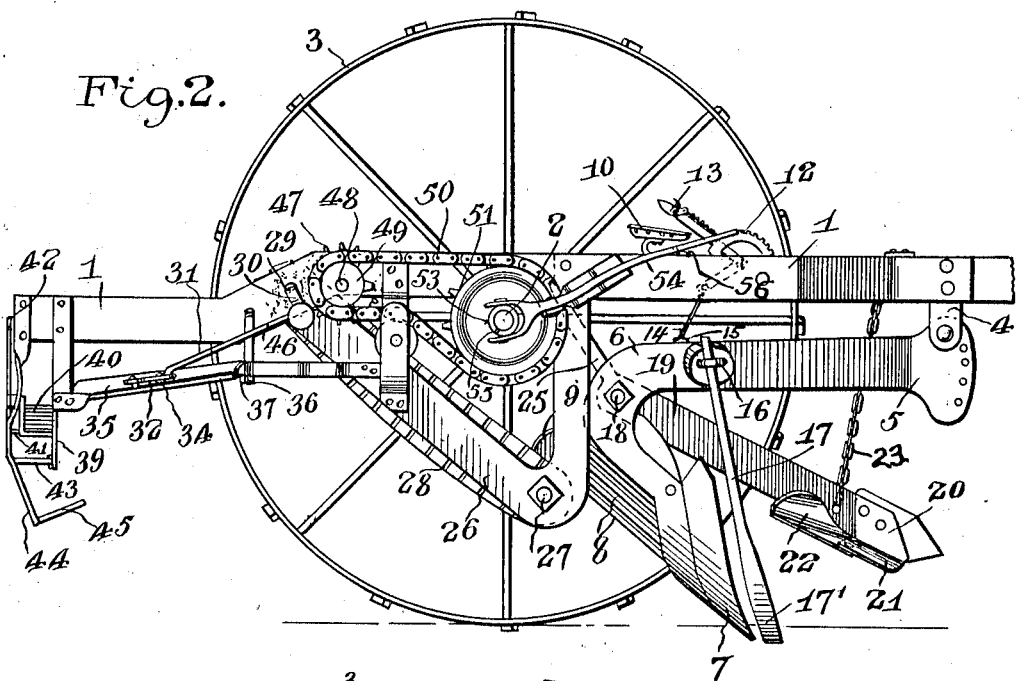
Figure 3:
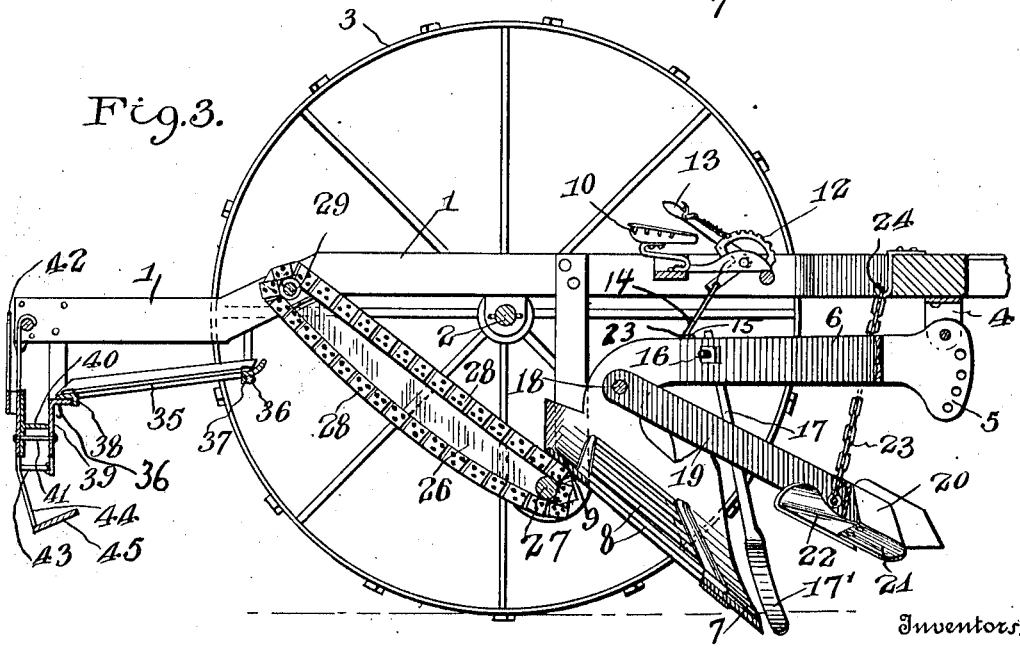

Figure 1 is a top plan view of the machine embodying the invention, the seat and adjacent parts removed for the purposes of clear illustration; Fig. 2 is a side elevation of the machine with the near wheel removed; Fig. 3 is a vertical longitudinal section; Fig. 4 is a detail elevation of the dumping trough and means for supporting the same.

Throughout the following detail description and on the several figures of the drawings, similar parts are referred to by like reference characters.

In carrying out the invention, a machine built in accordance therewith comprises a suitable horizontal frame 1, supported on an axle 2 and ground wheels 3. At the front end of the frame 1 is a depending arm 4 to which is pivotally secured a beam 5 having the rearwardly diverging members 6, the rear ends of which curve downwardly and are secured to a shovel 7 by which the potatoes are removed from the ground. The shovel 7 has a grating 8 projecting upwardly therefrom, the bars of the grating being secured at one end to the shovel and at the other end to the transversely curved plate 9, the curvature of the grating and shovel corresponding. Spanning the frame 1 are cross bars carrying a seat 10 and a longitudinal plate 11, the latter having a toothed segment 12 coöperating with the latch of a lever 13 pivoted to the plate 11. The lever 13 is convenient to be grasped by the operator and has an arm connected by a rod 14 with a cross piece 15, the opposite ends of which are secured to the rear portions of the divergent members 6 of the standard 5. By operation of the lever 13, the shovel may be raised or lowered bodily. Secured to the opposite portions of the divergent members 6, by means of clamp bolts 16, are the vertically arranged colters 17 which are formed with the downwardly and inwardly curving blades 17' which are vertically adjustable by reason of the provision of the bolts 16. The blades 17' of the colters 17 have a curvature conforming with that of the earth penetrating portion of the shovel 7. A cross rod 18 also connects the rear portions of the members 6 of the beam 5 and pivoted to said cross rod are the spaced rear ends 19 of an auxiliary beam 20 carrying at its opposite sides lateral knives 21 adapted to cut vines or weeds, the latter when cut being thrown outwardly in opposite directions from the knives 21 by deflectors 22. The knife beam 20 is adapted for adjustment with and independently of the beam 5 by reason of the pivotal connection thereof to the cross rod 18. A chain or similar connection 23 secured permanently at its lower end to the beam 20 is adapted to be engaged at its upper portion with a hook 24 on the front end of the frame 1, whereby to hold the beam 20 and knives 21 at a suitable adjustment, either operative or inoperative. One of the spaced rear ends 19 of the beam 20 is projected upwardly and rearwardly from the rod 18 to provide a lever arm 25 adapted to be actuated by the operator on the seat 10 to readily raise the front end of the beam 20 with the knives 21.

Extending downwardly from the sides of the frame 1 intermediate of their ends are the spaced V-shaped standards 26, in the lower extremities of which are provided suitable bearings receiving a shaft 27 by which passes the lower end of an endless conveyer 28 which forms an elevator. A second shaft 29 mounted in bearings on the sides of the frame 1 has the conveyer 28 passing around the same, said conveyer being composed of endless side chains and rods connecting said chains, and so arranged as to readily carry upwardly the potatoes received thereon from the shovel 7. The shaft 29 has at one end a crank arm 30 connected by a pitman rod 31 to a bell crank lever 32 which is mounted upon a bracket 33 projecting laterally from the rear end of the frame 1. The bell crank lever 32 is connected by a short rod 34 to a horizontal movable sieve 35. The sieve 35 is supported by transverse guides 36 which project downwardly from the rear end of the frame, there being short projections 37 at the front bar of the sieve extending downwardly for coöperation with the foremost of the guides 36. The rearmost guide 36 is engaged by other projections 38 extending beneath the latter guide 36. The rearmost guide 36 has a downwardly extending plate 39 at its rear edge, the latter forming a wall of a tilting trough 40 which is pivoted intermediate its ends at 41 and adapted to be moved into either of oppositely inclined positions by means of a lever 42. At the opposite ends of the trough 41 are bag supporting frames 43, and the potatoes dropping into the trough from the sieve 35 are adapted to be alternately fed into bags located beneath opposite ends of the trough by proper adjustment of the latter in an obvious manner. Depending brackets 44 carry a horizontal supporting plate 45 on which the filled bags may rest. A gear 46 on the rear shaft 29 meshes with a larger drive gear 47 carried by a stub shaft 48 on which a sprocket gear 49 is mounted also, the latter being connected by a drive chain 50 with a sprocket gear 51 loosely mounted on the axle 2.

The axle 2 rotates with the ground wheels 3 and a clutch member 52 is supported on the axle for rotation therewith and is movable into and out of engagement with the clutch member 53 on the gear 51. A lever 54 is employed to control the operation of the clutch 52, a spring 55 normally tending to force said clutch member 52 into engagement with the clutch member 53. An arm 56 projects laterally from the frame 1 and has a projection to coöperate with the lever 54 in order to hold said lever in a position wherein the clutch parts 52 and 53 are not engaged.

In the operation of the machine, the potatoes are carried upwardly from the shovel 7 to the sieve 35 by means of the elevator 28, a portion of the dirt on the potatoes being separated therefrom as they pass along the rear portion of the shovel up the conveyer or elevator 28 and the balance of the dirt separated from the potatoes by the movement of the sieve 35 which is constantly agitated while the machine is in operation. The adjustment of the trough 40 permits of directing the potatoes into either one of the bags which may be supported by the frames 43 and plate 45.

Having thus described the invention, what is claimed as new is:

1. In a potato digging machine, the combination of a wheeled frame, a shovel beam pivoted to the front end of said frame, a shovel carried by the rear end portion of said beam, colters adjustably mounted upon the sides of the beam in advance of the penetrating portion of the shovel, and a vine cutter arranged in advance of the colters and shovel, and movably mounted upon the beam of the shovel.

2. In a potato digging machine, the combination of a wheeled frame, a shovel beam pivoted to the front end of said frame, a shovel carried by the rear end portion of said beam, colters adjustably mounted upon the sides of the beam in advance of the penetrating portion of the shovel, a vine cutter arranged in advance of the colters and shovel and movably mounted upon the beam of the shovel, an adjustable connection between the front end of the vine cutter and the front end of the wheeled frame, and a lever arm projecting from the rear end of the vine cutter.

3. In a potato digging machine, the combination of a wheeled frame, a shovel beam pivoted at its front end to the front portion of said frame and comprising spaced rearwardly diverging members, a shovel carried by the rear ends of said diverging members, a cross piece connecting said divergent members, a lever operably connected to the cross piece for raising and lowering the shovel beam, a cross rod also connecting the divergent members, an auxiliary beam pivoted at its rear end to said cross rod, cutting knives carried by the front end of said auxiliary beam, and an adjustable connection between the front portion of said auxiliary beam and the frame.

4. In a potato digging machine, the combination of a wheeled frame, a shovel beam pivoted at its front end to the front portion of said frame and comprising spaced rearwardly diverging members, a shovel carried by the rear ends of said diverging members, a cross piece connecting said divergent members, a lever operably connected to the cross piece for raising and lowering the shovel beam, a cross rod also connecting the divergent members, an auxiliary beam pivoted at its rear end to said cross rod, cutting knives carried by the front end of said auxiliary beam, and an adjustable connection between the front portion of said auxiliary beam and the frame, the auxiliary beam also comprising spaced rear end portions, one of which is projected beyond the cross rod aforesaid to form a lever arm for movement of the auxiliary beam by an operator.

5. In a potato digging machine, the combination of a wheeled frame, a shovel beam pivoted at its front end to the front portion of the frame and comprising rearwardly diverging members extending downwardly at their rear ends, a shovel carried by the rear ends of said diverging members, a lever mounted on the frame and connected with the shovel beam for raising and lowering the same bodily, an auxiliary beam pivoted at its rear end to the rear portion of the shovel beam, cutting knives at the front end of the auxiliary beam and arranged in advance of the shovel beam, and an adjustable connection between the front end of the auxiliary beam and the front end of the wheeled frame.

6. In a potato digging machine, the combination of a wheeled frame, a shovel beam pivoted at its front end thereto and comprising rearwardly extending divergent members curving downwardly at their rear extremities, a shovel carried by the rear ends of said members, a cross rod connecting the divergent members adjacent to their rear ends, an auxiliary beam consisting of spaced rearwardly extending members pivoted at their rear end portions to the cross rod for movement with the shovel beam, one of the spaced members of the auxiliary beam being projected beyond the cross rod upwardly between the sides of the frame to form a lever arm, a connection secured to the front end of the auxiliary beam and adapted for adjustable connection to the front end of the frame, cutting knives projecting from opposite sides of the front end of the auxiliary beam, deflectors in rear of said cutting knives, and colters adjustably connected at their upper ends to the diverging members of the shovel beam and having their lower earth penetrating ends arranged between the cutting knives and the shovel.

In testimony whereof we affix our signatures in presence of two witnesses.

MINEOLA McILVEENE.
LEWIS A. HAYES.

Witnesses:
H. F. LONG,
CARRIE GRIFFITH.

Copies of this patent may be obtained for five cents each, by addressing the "Commissioner of Patents, Washington, D. C."